United States Patent
Ahn et al.

(10) Patent No.: US 11,872,623 B2
(45) Date of Patent: *Jan. 16, 2024

(54) THERMOSETTING COMPOSITION

(71) Applicant: LG CHEM, LTD., Seoul (KR)

(72) Inventors: Sang Bum Ahn, Daejeon (KR); Jin Kyu Lee, Daejeon (KR)

(73) Assignee: LG CHEM, LTD., Seoul (KR)

( * ) Notice: Subject to any disclaimer, the term of this patent is extended or adjusted under 35 U.S.C. 154(b) by 1157 days.

This patent is subject to a terminal disclaimer.

(21) Appl. No.: 16/347,367

(22) PCT Filed: Nov. 6, 2017

(86) PCT No.: PCT/KR2017/012477
§ 371 (c)(1),
(2) Date: May 3, 2019

(87) PCT Pub. No.: WO2018/084666
PCT Pub. Date: May 11, 2018

(65) Prior Publication Data
US 2020/0262999 A1   Aug. 20, 2020

(30) Foreign Application Priority Data
Nov. 4, 2016 (KR) ........................ 10-2016-0146734

(51) Int. Cl.
| | | |
|---|---|---|
| *B22F 1/10* | (2022.01) | |
| *B01J 19/08* | (2006.01) | |
| *B29C 35/08* | (2006.01) | |
| *B33Y 70/10* | (2020.01) | |
| *C08K 3/22* | (2006.01) | |
| *H01F 1/047* | (2006.01) | |
| *H01F 1/147* | (2006.01) | |
| *B29K 101/10* | (2006.01) | |
| *B29K 509/02* | (2006.01) | |

(52) U.S. Cl.
CPC .............. *B22F 1/10* (2022.01); *B01J 19/087* (2013.01); *B29C 35/08* (2013.01); *B33Y 70/10* (2020.01); *C08K 3/22* (2013.01); *H01F 1/047* (2013.01); *H01F 1/147* (2013.01); *B01J 2219/0862* (2013.01); *B01J 2219/0879* (2013.01); *B29K 2101/10* (2013.01); *B29K 2509/02* (2013.01); *B29K 2995/0008* (2013.01); *C08K 2003/2262* (2013.01); *C08K 2003/2265* (2013.01)

(58) Field of Classification Search
CPC .............. C08K 3/22; C08K 2003/2262; C08K 2003/2265; B33Y 70/10; B01J 19/087; B01J 2219/0862; B01J 2219/0879; B29C 35/08; H01F 1/047; H01F 1/147; B29K 2101/10; B29K 2509/02; B29K 2995/0008

See application file for complete search history.

(56) References Cited

U.S. PATENT DOCUMENTS

| | | | |
|---|---|---|---|
| 10,892,075 B2 * | 1/2021 | Lee .................... | B22F 10/36 |
| 11,232,891 B2 * | 1/2022 | Park .................... | C09D 5/23 |
| 2009/0039309 A1 | 2/2009 | Bose et al. | |
| 2009/0230347 A1 * | 9/2009 | Pridohl ................ | B82Y 25/00 |
| | | | 219/678 |
| 2013/0309488 A1 * | 11/2013 | Fukami ............... | B29C 45/0013 |
| | | | 428/221 |
| 2014/0107313 A1 * | 4/2014 | Burckhardt .......... | C08G 59/56 |
| | | | 252/182.13 |
| 2018/0154577 A1 | 6/2018 | Lee | |
| 2018/0273776 A1 * | 9/2018 | Ahn .................... | C09D 5/00 |
| 2019/0040248 A1 * | 2/2019 | Ahn .................... | C08L 27/12 |

FOREIGN PATENT DOCUMENTS

| | | |
|---|---|---|
| CN | 101069250 A | 11/2007 |
| CN | 102067248 A | 5/2011 |
| CN | 103213281 | 7/2013 |
| CN | 108026320 A | 5/2018 |
| EP | 2277179 | 1/2011 |
| EP | 3354376 | 8/2018 |
| EP | 3354684 | 8/2018 |
| EP | 3412715 | 12/2018 |
| JP | 2006100292 | 4/2006 |
| JP | 2008521747 A | 6/2008 |
| JP | 2009155545 A | 7/2009 |
| JP | 2018514868 A | 6/2018 |
| KR | 1020010098959 | 11/2001 |
| KR | 1020050044409 | 5/2005 |
| KR | 1020070084616 | 8/2007 |
| KR | 1020110117138 | 10/2011 |
| KR | 1020130104066 | 9/2013 |
| KR | 1020150073083 | 6/2015 |
| KR | 1020160076178 | 6/2016 |
| WO | 2006/058689 | 6/2006 |
| WO | 2015120429 | 8/2015 |
| WO | 2016176593 A1 | 11/2016 |
| WO | 2016178545 A1 | 11/2016 |
| WO | 2017/052337 | 3/2017 |
| WO | 2017052339 | 3/2017 |
| WO | 2017/135576 | 8/2017 |

OTHER PUBLICATIONS

Extended European Search Report corresponding to EP17867473.5, dated Oct. 15, 2019 (9 pp).
International Search Report of the International Searching Authority corresponding for PCT/KR2017/012477, dated Feb. 12, 2018. (5 pages with English translation).

* cited by examiner

*Primary Examiner* — Brian R Ohara
(74) *Attorney, Agent, or Firm* — Myers Bigel, P.A.

(57) ABSTRACT

The present invention relates to a thermosetting composition and a method for curing the same, and provides a thermosetting composition capable of realizing uniform curing physical properties of a cured product.

24 Claims, No Drawings

THERMOSETTING COMPOSITION

CROSS-REFERENCE TO RELATED APPLICATIONS

This application is a 35 U.S.C. § 371 national stage application of PCP International Application No. PCT/KR2017/012477, filed Nov. 6, 2017, which claims priority from Korean Patent Application No, 10-2016-0146734, filed Nov. 4, 2016, the contents of which are incorporated herein in their entireties by reference. The above-referenced PCT International Application was published in the Korean language as International Publication No. WO 2018/084666 A1 on May 11, 2018.

TECHNICAL FIELD

The present application relates to a thermosetting composition and a method for curing the same.

BACKGROUND ART

A three-dimensional printer has a three-dimensional printing mechanism configured to three-dimensionally form a physical object. Researches related to a curable resin composition as a three-dimensional printing ink for three-dimensionally forming a physical object by such a three-dimensional printer, have been continuing.

In implementing the desired patterns or solid shapes, conventional 3D printing methods have been carried out by a method for curing a resin composition by heat, light, or the like. However, among these methods, the case of the thermosetting type is a relatively simple manufacturing process in which polymer filaments are thermally melted, extruded and dropped in drops at the designated point to complete a shape of laminating layer by layer, but there are problems such as an imprecise shape and non-uniform curing due to an equipment supplying heat, phase separation between organic/inorganic composite materials and heat shrinkage due to heating/cooling. In addition, the case of the photo-curable type can express precisely, but there are problems such as size of equipment, storage and low hardness after curing.

DISCLOSURE

Technical Problem

The present invention relates to a thermosetting composition, and provides a thermosetting resin composition capable of realizing uniform curing physical properties of a cured product.

Technical Solution

The present application relates to a thermosetting composition. The thermosetting composition can be applied, for example, to form a three-dimensional shape by printing a three-dimensional physical object. In addition, the thermosetting composition can be used as a sealing material for sealing an electronic device. For example, the composition can be used as a sealing material to encapsulate a microelectronic device, for example, a micro-battery.

An exemplary thermosetting composition may comprise a thermosetting resin, and magnetic particles. The magnetic particles may have two or more magnetic domains (multi-magnetic domains). In addition, the magnetic particles may have irregularly arranged magnetic domains when an external magnetic field is absent, and be magnetized by an external alternate-current magnetic field. Here, the irregular arrangement of the magnetic domains may mean a state where magnetic directions existing in the magnetic domains are each different and not aligned, and in this case, may be a state without magnetism as the net value of the magnetization at room temperature is zero. However, when an external magnetic field is applied, the magnetic directions of the magnetic domains are aligned, whereby the magnetic particles can be magnetized. The magnetic particles may be super-paramagnetic particles, but are not limited thereto. In the curing method according to the present application, vibrational heat is generated from the magnetic particles through the application of a magnetic field to the composition, whereby the entire thermosetting resin can be uniformly cured.

Among the existing curing methods through magnetic particles, there is also a method for curing or sintering a resin using a technique to generate heat by adding a metal or a conductive material (carbon or carbon nanotube) and electromagnetically inducing or irradiating it with microwaves, but in the case of electromagnetic induction, the temperature difference between the contact surface and the inside may be generated to cause a problem in the physical properties of the resin after curing, and in the case of microwaves, there is a risk of exposure to the human body during the replacement operation in the process.

The present application generates vibrational heat by magnetization reversal of magnetic particles through electromagnetic induction heating, whereby the generated heat can cure the thermosetting resin. In the case of the conventional technique to generate heat by electromagnetic induction, heat is generated by eddy current, where heat was generated by hysteresis loss of a metal or a magnetic material. However, in the case of the present application, as the particles of the magnetic material become smaller to be nano-sized, the hysteresis loss of the magnetic material itself becomes smaller and only the saturation magnetization value exists. Therefore, the present application can generate heat due to vibrations between magnetic materials, other than eddy currents. That is, in the present application, the magnetic material itself vibrates due to the coercive force of the magnetic particles under an external magnetic field, where the thermosetting resin can be cured using the generated heat, and the curing proceeds from the inside of the composition, so that the cured product can have excellent physical properties. Accordingly, the present application can realize uniform and stable curing.

As described above, the magnetic particles may comprise two or more magnetic domains. In the present specification, the term "magnetic domain" generally means a region in which magnetization directions are differently divided within a magnetic material. In the present application, magnetic particles having two or more magnetic domains are strongly magnetized by an external alternate-current magnetic field to generate vibrational heat, and when the magnetic field is eliminated, the magnetic particles return to the original magnetic domains, whereby magnetic particles with low residual magnetization of hysteresis loss can be provided.

In one example, the magnetic particles may have a coercive force in a range of 1 to 200 kOe, 10 to 150 kOe, 20 to 120 kOe, 30 to 100 kOe, 40 to 95 kOe, or 50 to 95 kOe. The term "coercive force" herein may mean an intensity of the critical magnetic field required to reduce the magnetization of the magnetic material to zero. More specifically, a magnetic material magnetized by an external magnetic field maintains a certain degree of magnetized state even if a magnetic field is removed, where the intensity of a magnetic field capable of making the magnetization degree to zero by applying a reverse magnetic field to the magnetic material thus magnetized is referred to as a coercive force. The coercive force of the magnetic material may be a criterion for distinguishing a soft magnetic material or a hard magnetic material, and the magnetic particles of the present application may be a soft magnetic material. By controlling the coercive force of the magnetic particles in the above range, the present application more easily realizes the magnetization reversal of the magnetic material to generate vibrational heat to a desired degree in the present application, so that it can satisfy a desired degree of curing physical properties by uniform curing of the resin.

In one example, for a physical property value measured in the present application, when the measured value is a value varying with temperature, the measured temperature may be room temperature, for example, 25° C.

Furthermore, in one example, the magnetic particle has a saturation magnetization value at 25° C. in a range of 20 to 150 emu/g, 30 to 130 emu/g, 40 to 100 emu/g, 50 to 90 emu/g, or 60 to 85 emu/g. By being capable of controlling the magnetic particles to have a relatively large saturation magnetization value and thus generating heat by vibration between magnetic particles other than eddy currents, the present application can satisfy curing physical properties by uniform curing of the resin. In the present application, the measurement of physical properties of the magnetic particles can be calculated by the value of VSM (Vibrating Sample Magnetometer). The VSM is a device that measures magnetization values of samples by recording the applied magnetic field applied by a Hall probe and recording the electromotive force obtained on applying vibration to the sample by Faraday's law. According to Faraday's law, it can be seen that if the N pole of a bar magnet is directed and pushed towards the coil, the galvanometer moves and the current flows through the coil. The resultant current is called induction current, which is said to have been made by induced electromotive force. The VSM is a method of detecting the induced electromotive force, which occurs on vibrating a sample by such a basic operation principle, in the search coil, to measure the magnetization value of the sample by this electromotive force. The magnetic characteristics of a material can be measured simply as functions of magnetic field, temperature and time, and quick measurement in a magnetic force of up to 2 Tesla and a temperature range of 2 K to 1273 K is possible.

In an embodiment of the present application, the magnetic particles may have an average particle diameter in a range of 20 nm to 300 nm, 30 nm to 250 nm, 40 nm to 230 nm, or 45 nm to 220 nm. In addition, the magnetic domains in the magnetic particles may have an average size in a range of 10 to 50 nm or 20 to 30 nm. The present application can generate heat capable of uniformly curing the resin in the composition by controlling the number of magnetic domains and the magnitude of the coercive force of the magnetic particles to an appropriate range in the particle size range. The present application can generate sufficient vibrational heat on curing through a low coercive force and a large number of magnetic domains by controlling the size of the particles to 20 nm or more, and allow only the saturation magnetization value to be present while reducing hysteresis loss of the magnetic material itself, thereby realizing uniform and stable curing by controlling the particle size to 300 nm or less.

If the magnetic particles of the present application can generate heat through electromagnetic induction heating, the material is not particularly limited. In one example, the magnetic particles may satisfy Formula 1 below.

$$MX_aO_b$$ [Formula 1]

In Formula 1 above, M is a metal or a metal oxide, X includes Fe, Mn, Co, Ni or Zn, and $|a \times c|=|b \times d|$ is satisfied, where c is the cation charge of X, and d is the anion charge of oxygen. In one example, M may be Fe, Mn, Mg, Ca, Zn, Cu, Co, Sr, Si, Ni, Ba, Cs, K, Ra, Rb, Be, Li, Y, B, or an oxide thereof. For example, when $X_aO_b$ is $Fe_2O_3$, c may be +3 and d may be −2. Also, for example, when $X_aO_b$ is $Fe_3O_4$, it can be expressed as $FeOFe_2O_3$, so that c may be +2 and +3, respectively, and d may be −2. The magnetic particles of the present application are not particularly limited as long as they satisfy Formula 1 above, and may be, for example, $MFe_2O_3$.

In one example, the thermosetting composition of the present application may comprise, as magnetic particles, a compound of Formula 1 above alone, or a mixture of compounds of Formula 1 or a compound including a compound of Formula 1 doped with an inorganic substance. The inorganic substance may comprise a monovalent to trivalent cationic metal or an oxide thereof, and two or more of plural cationic metals may be used.

In one example, the magnetic particles may comprise those having surface-treated particle surfaces. That is, the composition of the present application may comprise particles surface-treated with a metal, a metal oxide, an organic substance or an inorganic substance on the surface of the magnetic particles. The present application can prevent the magnetic particles from losing the coercive force of the magnetic material by oxidation in air through the surface treatment. Furthermore, the surface treatment can improve compatibility with the filler, the dispersant organic solvent and the like to be described below, and improve dispersibility of the composition. In one example, the surface treatment can form a polymer of polymethyl methacrylate (PMMA) on the surface by attaching a methyl methacrylate (MMA) monomer to a magnetic particle having a carboxyl group on its surface. In addition, the surface treatment can be carried out by being subjected to an acid treatment to remove the oxide film on the surface, and the surface treatment can be also carried out through a method of coating silica particles.

In an embodiment of the present application, the magnetic particles may form magnetic clusters. By forming the nanoclusters, the nanoparticle-sized magnetic material can prevent agglomeration between the magnetic materials and improve dispersibility, thereby effectively curing the resin by vibrational heat.

In an embodiment of the present application, the magnetic particles may be included in an amount of 0.01 to 25 parts by weight, 0.1 to 20 parts by weight, 1 to 15 parts by weight, 3 to 13 parts by weight, or 5 to 12 parts by weight, relative to 100 parts by weight of the thermosetting resin. In the present specification, unless otherwise specified, the unit "part by weight" means a weight ratio between the respective components. By controlling the content of the magnetic particles in the above weight ratio, the present application can cure the composition through sufficient heat upon thermosetting, and allow the composition to be uniformly cured without phase separation of the composition.

In one example, the thermosetting composition of the present application may comprise a curable compound. The curable compound may be a thermosetting resin. The term "thermosetting resin" means a resin that can be cured through application of an appropriate heat or an aging process.

The specific kind of the thermosetting resin in the present application is not particularly limited as long as it has the above-mentioned characteristics. In one example, the thermosetting resin may comprise at least one thermosetting functional group. For example, it may comprise one or more of thermosetting functional groups such as an epoxy group, a glycidyl group, an isocyanate group, a hydroxy group, a carboxyl group or an amide group, which can be cured to exhibit the adhesive property. In addition, a specific kind of the resin as above may include an acrylic resin, a polyester resin, an isocyanate resin, an ester resin, an imide resin or an epoxy resin, but is not limited thereto.

As the thermosetting resin in the present application, aromatic or aliphatic; or linear or branched epoxy resins may be used. In one embodiment of the present application, an epoxy resin having an epoxy equivalent of 180 g/eq to 1,000 g/eq, which contains two or more functional groups, may be used. By using an epoxy resin having an epoxy equivalent in the above range, properties such as adhesion performance and glass transition temperature of the cured product can be effectively maintained. An example of such an epoxy resin may include one or a mixture of two or more of a cresol novolac epoxy resin, a bisphenol A epoxy resin, a bisphenol A novolac epoxy resin, a phenol novolac epoxy resin, a tetrafunctional epoxy resin, a biphenyl type epoxy resin, a triphenol methane type epoxy resin, an alkyl-modified triphenol methane epoxy resin, a naphthalene-type epoxy resin, a dicyclopentadiene type epoxy resin, or a dicyclopentadiene-modified phenol type epoxy resin.

In the present application, preferably, an epoxy resin containing a cyclic structure in the molecular structure may be used, and more preferably, an epoxy resin containing an aromatic group (e.g., a phenyl group) may be used. When the epoxy resin comprises an aromatic group, the cured product may have excellent thermal and chemical stability. A specific example of the aromatic group-containing epoxy resin that can be used in the present application may be one or a mixture of two or more of a biphenyl type epoxy resin, a dicyclopentadiene type epoxy resin, a naphthalene type epoxy resin, a dicyclopentadiene-modified phenol type epoxy resin, a cresol-based epoxy resin, a bisphenol-based epoxy resin, a xylylol-based epoxy resin, a polyfunctional epoxy resin, a phenol novolac epoxy resin, a triphenol methane type epoxy resin, and an alkyl-modified triphenol methane epoxy resin, and the like, but is not limited thereto.

Here, as described above, the thermosetting composition may further comprise a thermosetting agent. For example, it may further comprise a curing agent capable of reacting with the thermosetting resin to form a cross-linked structure or the like.

As the curing agent, an appropriate type may be selected and used according to the type of the functional group contained in the resin.

In one example, when the thermosetting resin is an epoxy resin, as the curing agent, a curing agent of the epoxy resin known in this field, for example, one or two or more of an amine curing agent, an imidazole curing agent, a phenol curing agent, a phosphorus curing agent, or an acid anhydride curing agent may be used, without being limited thereto.

In one example, as the curing agent, an imidazole compound which is solid at room temperature and has a melting point or a decomposition temperature of 80° C. or higher may be used. As this compound, 2-methylimidazole, 2-heptadecylimidazole, 2-phenylimidazole, 2-phenyl-4-methylimidazole or 1-cyanoethyl-2-phenylimidazole, and the like can be exemplified, but is not limited thereto.

The content of the curing agent may be selected depending on composition of the composition, for example, the kind and ratio of the thermosetting resin. For example, the curing agent may be included in an amount of 1 to 20 parts by weight, 1 to 10 parts by weight, or 1 to 8 parts by weight, relative to 100 parts by weight of the thermosetting resin. However, the weight ratio can be changed depending on the kind and ratio of the functional group of the thermosetting resin, the cross-linking density to be implemented, and the like.

In an embodiment of the present application, the thermosetting composition may further comprise a filler. The filler may be an organic filler, an inorganic filler, or a mixture thereof. The specific kind of the filler that can be used in the present application is not particularly limited and for example, one or a mixture of two or more of carbon black, carbon nanotubes, glass fiber, silica, synthetic rubber, $TiO_2$, organic/inorganic pigment, clay, or talc, and the like may be used. The filler may be included in an amount of 1 to 100 parts by weight, 10 to 80 parts by weight, or 20 to 60 parts by weight, relative to 100 parts by weight of the thermosetting resin. By using the filler, the present application can ensure the mechanical properties (rigidity, reinforcement) after the composition is cured, and improve dispersibility and bonding property between the nano-sized magnetic material and the organic material.

Furthermore, in one example, the thermosetting composition may further comprise a dispersant so that the magnetic particles can be uniformly dispersed. Here, as the usable dispersant, for example, a surfactant having an affinity with the surface of the magnetic particle and having good compatibility with the thermosetting resin, such as a nonionic surfactant, can be used. In addition, as the dispersant, a dispersant of a type containing an acidic or basic group, a high molecular weight acrylic polymer type having a weight average molecular weight of 10,000 or more, an inorganic soda type, or a metal salt type, and the like can be exemplified, and the composition of the present application may comprise one or more dispersants. The dispersant may be included in an amount of 0.01 to 10 parts by weight, 0.1 to 8 parts by weight, or 0.15 to 5 parts by weight, relative to 100 parts by weight of the thermosetting resin.

In one example, the thermosetting composition of the present application may comprise a thermoplastic resin. The thermoplastic resin may include, for example, an acrylic resin, a silicone resin, a fluororesin, a styrene resin, a polyolefin resin, a thermoplastic elastomer, a polyoxyalkylene resin, a polyester resin, a polyvinyl chloride resin, a polycarbonate resin, a polyphenylene sulfide resin, polyurethane, a cellulose resin, a polyacetal resin or a polyamide resin.

Here, as the styrene resin, styrene-ethylene-butadiene-styrene block copolymer (SEBS), styrene-isoprene-styrene block copolymer (SIS), acrylonitrile-butadiene-styrene block copolymer (ABS), acrylonitrile-styrene-acrylate block copolymer (ASA), styrene-butadiene-styrene block copolymer (SBS), styrene homopolymer or a mixture thereof can be exemplified. As the olefin resin, for example, a high-density polyethylene-based resin, a low-density polyethylene-based resin, a polypropylene-based resin, or a mixture thereof can be exemplified. As the thermoplastic elastomer, for example, an ester-based thermoplastic elastomer, an olefin-based thermoplastic elastomer or a mixture thereof and the like can be used. Particularly, as the olefin-based thermoplastic elastomer, a polybutadiene resin or a polyisobutylene resin and the like can be used. As the polyoxyalkylene resin, for example, a polyoxymethylene resin, a polyoxyethylene resin or a mixture thereof can be exemplified. As the polyester resin, for example, a polyethylene terephthalate resin, a polybutylene terephthalate resin or a mixture thereof and the like can be exemplified. As the polyvinyl chloride resin, for example, polyvinylidene chloride and the like can be exemplified. In addition, a mixture of hydrocarbon resins can be included, and for example, hexatriacotane or paraffin and the like can be exemplified. As the polyamide resin, for example, nylon and the like can be exemplified. As the acrylate resin, for example, polybutyl (meth)acrylate and the like can be exemplified. As the silicone resin, for example, polydimethylsiloxane and the like can be exemplified. Furthermore, as the fluororesin, polytrifluoroethylene resin, polytetrafluoroethylene resin, polychlorotrifluoroethylene resin, polyhexafluoropropylene resin, polyfluorinated vinylidene, polyfluorinated vinyl, polyfluorinated ethylene propylene or a mixture thereof, and the like can be exemplified.

The above-listed resins may be also used, for example, by being grafted with maleic anhydride or the like, or by being copolymerized with the other resins as listed or monomers for producing resins, or by being modified with other compounds. An example of such other compounds may include carboxyl-terminal butadiene-acrylonitrile copolymer and the like.

The thermosetting composition according to the present application may comprise various additives depending on applications, the kind of the thermosetting resin, and the thermosetting process described below, in addition to the above-described constitutions, in the range without affecting the above-described effects of invention. For example, the resin composition may comprise a coupling agent, a cross-linking agent, a curable material, a tackifier, an ultraviolet stabilizer, or an antioxidant in an appropriate amount depending on the desired physical properties. Here, the curable material may mean a material having a thermosetting functional group and/or an active energy ray-curable functional group, which is separately included in addition to the components constituting the above-mentioned composition.

In one example, the thermosetting composition can reduce the current value of the magnetic field or the magnetic field application time, for curing the composition, as the volume of the composition increases. The fact that can reduce the current value or the magnetic field application time means that the composition can be cured by a smaller current value or application time as the volume increases. The present application can suppress rapid curing by lowering the current value to reduce the magnetic field intensity, as the volume of the thermosetting composition increases. In addition, the present application can realize excellent curing physical properties by reducing the magnetic field application time, as the volume increases.

The present application also relates to a method for curing the above-described thermosetting composition. An exemplary curing method may comprise a step of applying a magnetic field to the above-described composition. The present application generates vibrational heat from the magnetic particles through the application step, whereby the thermosetting resin can be uniformly cured.

The step of applying a magnetic field is not particularly limited and can be performed with a known method by those skilled in the art. For example, the step of applying a magnetic field may be performed by applying a magnetic field with a current of 50 A to 500 A, 80 A to 450 A, or 120 A to 430 A at a frequency of 100 kHz to 1 GHz for 20 seconds to 60 minutes, 30 seconds to 30 minutes, or 30 seconds to 200 seconds.

In one example, the step of applying a magnetic field may comprise at least two steps of multi-profile methods. The upper limit of the above step is not particularly limited, but it may be 10 steps or 7 steps or less. The multi-profile method may be performed at a frequency of 100 kHz to 1 GHz. Specifically, the multi-profile method may comprise a first step of applying a magnetic field with a current of 10 A to 120 A for 20 seconds to 10 minutes, a second step of applying a magnetic field with a current of 80 A to 150 A for 20 seconds to 10 minutes and/or a third step of applying a magnetic field with a current of 85 A to 500 A for 5 seconds to 5 minutes.

In addition, the step of applying a magnetic field may also proceed in a manner that gives a gradient difference of the profile. For example, in the case of the multi-profile method, it is a method of applying the magnetic field by controlling the intensity of the magnetic field stepwise, but the method of giving a gradient difference is a method of sequentially raising the magnetic field with 50 to 200 A at an interval, which can block rapid exotherm and the gradient value is not particularly limited. The method can prevent characteristic deterioration of the cured product to cause thermal degradation depending on characteristics of the resin to be cured upon rapidly applying heat.

On the other hand, the thermosetting can proceed with application of the magnetic field as described above, and may comprise additionally applying heat at 40° C. to 100° C. or 50° C. to 80° C. for 30 minutes to 24 hours or 1 to 24 hours, after applying the magnetic field. Furthermore, without being limited to the above, it is possible to apply heat together with applying the magnetic field.

Also, in an embodiment of the present application, the curing method may comprise a step of applying the above-described thermosetting composition, where the applying step may comprise only a primary applying step, but is not limited thereto, and may comprise secondary or more applying steps. In one example, the curing method may comprise a step of primarily applying the thermosetting composition prior to the step of applying the magnetic field and a step of secondarily applying the thermosetting composition after applying the magnetic field.

The method of applying the composition is not particularly limited, which can apply the thermosetting composition on a support in a desired shape. In addition, the method can apply the thermosetting composition at a desired position, rather than a support, in the desired cured product shape. The shape is not particularly limited.

In addition, the curing method may further comprise the step of applying a magnetic field after the secondary applying step. Accordingly, the curing method may have two magnetic field application steps, where the ratio a1/a2 of the current value a1 in the magnetic field application step after the primary application to the current value a2 in the magnetic field application step after the secondary application can be in a range of 1.01 to 3.0, 1.02 to 2.8, 1.03 to 2.5, 1.1 to 2.3, or 1.2 to 2.0. If the thermosetting composition is applied secondarily, its volume increases with the amount of the primary application, and accordingly, the adjustment of the current value for the increased volume of the thermosetting composition is required. Since the magnetic content increases as the volume increases, the magnetic field application intensity can be controlled to be lower, and thus by controlling the current value to the above range, the present application can suppress the side reaction through application of the magnetic field in an appropriate range and cure the thermosetting composition without bubble formation on its surface.

Here, when the application of the magnetic field is performed by the above-described multi-profile method, the current value a1 after the primary application may be the sum of all the current values of the respective steps of the multi-profile method. For example, if the three-step magnetic field application step has been performed after the primary application, the value a1 may be the sum of the respective current values at the time of applying the magnetic field in the three steps, and the current value a2 after the secondary application can be the same as above. Furthermore, without being limited to the above, when a1 is a current value of any one step of the three-step magnetic field application step, a2 may also be a current value of any one step of the three-step magnetic field application step. For example, if a1 is a current value at the first-step magnetic field application after the primary application, a2 may also be a current value at the first-step magnetic field application after the secondary application. Besides, in the case of applying the magnetic field with the above-described gradient difference, the value a1 and the value a2 may be each the total amount of the current values applied after the primary application and after the secondary application, or may each mean the maximum value of the current values.

In an embodiment of the present application, the current value a1 may be in the range of 20 A to 500 A or 50 A to 400 A, and the current value a2 may be in the range of 10 A to 400 A or 30 A to 350 A. The present application can provide a cured product of a thermosetting composition having excellent curing physical properties by controlling the current value within the above range for each applying step.

In one example, the step of applying the magnetic field may comprise controlling the current value or the magnetic field application time to be small as the volume of the thermosetting composition increases. In one example, the present application can suppress rapid curing by lowering the current value to decrease the magnetic field intensity as the volume increases. In addition, the present application can realize excellent curing physical properties by reducing the magnetic field application time as the volume increases.

The present application also relates to a cured product comprising the above-described thermosetting composition. The cured product may be a three-dimensional solid shape, or may be a sealing material.

In one example, the cured product may be an article cured by the above-described curing method. In one example, the cured product may be an article cured by applying a magnetic field with a reduced current value or magnetic field application time as the volume of the thermosetting composition increases.

The present application also relates to a microelectronic device. An exemplary microelectronic device may comprise a cured product comprising the above-described composition. For example, the microelectronic device may include a micro battery, a biosensor, an actuator, or the like. In addition, the present application can provide a display device using the above-described composition as a sealing material or the like.

Advantageous Effects

The present application provides a curable resin composition capable of realizing uniform curing physical properties of a cured product.

BEST MODE

Hereinafter, the present invention will be described in more detail with reference to Example complying with the present invention and Comparative Examples not complying with the present invention, but the scope of the present invention is not limited by the following examples.

Example 1

Soft magnetic (soft type) $FeOFe_2O_3$ particles (multi-magnetic domains, average particle diameter about 50 nm: measured by Field Emission Scanning Electron Microscope (using DLS)) as magnetic particles, KSR-177 from Kukdo Chemical as an epoxy resin, and SI-B2 A curing agent from Samshin Hwasung as a curing agent were each mixed at a weight ratio of 5:94:1 ($FeOFe_2O_3$: KSR-177: SI-B2 A) to prepare a resin composition.

Immediately after laminating it on a support through a nozzle in a feeding device, a magnetic field was applied thereto with a current value of 100 A for 1 minute in an external alternate-current magnetic field generator. The magnetic field was applied by introducing the composition into a sample vial in a solenoid coil (3 turns, OD 50 mm, ID 35 mm) and adjusting the current value and time of the magnetic field generator (Easyheat from Ambrell). The resin composition was thermally cured with vibrational heat generated through application of the magnetic field to form a cured product.

Example 2

A resin composition was prepared and a cured product was formed, in the same manner as in Example 1, except that the particle diameter of the magnetic particles was 100 nm.

Example 3

A resin composition was prepared and a cured product was formed, in the same manner as in Example 1, except that the contents of the magnetic particles, the resin and the curing agent were each included at a weight ratio of 10:90:5.

Example 4

A resin composition was prepared and a cured product was formed, in the same manner as in Example 1, except that the particle diameter of the magnetic particles was 200 nm.

Example 5

A resin composition was prepared and a cured product was formed, in the same manner as in Example 2, except that $MnOFe_2O_3$ particles (multi-magnetic domains, average particle diameter about 100 nm: measured by Field Emission Scanning Electron Microscope (using DLS)) were used as the magnetic particles.

Example 6

A resin composition was prepared and a cured product was formed, in the same manner as in Example 2, except that a magnetic field was applied for 3 minutes with a current value of 200 A using a pancake type (3 turns, diameter 50 mm) upon applying the magnetic field.

Example 7

A resin composition was prepared and a cured product was formed, in the same manner as in Example 2, except that a magnetic field was applied for 3 minutes with a current value of 200 A using Helmholtz coils (3 turns, diameter 20 mm) upon applying the magnetic field.

Example 8

A resin composition was prepared and a cured product was formed, in the same manner as in Example 2, except that a magnetic field having a current value of 100 A was applied for 45 seconds, a magnetic field having a current value of 120 A was applied for 10 seconds and a magnetic field having a current value of 150 A was applied for 5 seconds through a multi-profile method.

Example 9

A resin composition was prepared as in Example 2, and a cured product was formed in the following manner. Specifically, the resin composition is primarily applied on a support and cured by applying a magnetic field having a current value of 100 A for 45 seconds, a magnetic field having a current value of 120 A for 10 seconds and a magnetic field having a current value of 150 A for 5 seconds through the multi-profile method of the magnetic fields. Thereafter, in order to further laminate the resin composition thereon, a laminate was formed by applying a magnetic field having a current value of 84 A for 45 seconds, a magnetic field having a current value of 100 A for 10 seconds and a magnetic field having a current value of 125 A for 5 seconds after the secondary application.

Example 10

A resin composition was prepared as in Example 2, and a cured product was formed in the following method. Specifically, the resin composition is primarily applied on a support and cured through a multi-profile method of a magnetic field in which a magnetic field having a current value of 100 A is applied for 45 seconds, a magnetic field having a current value of 120 A is applied for 10 seconds and a magnetic field having a current value of 150 A is applied for 5 seconds. Thereafter, in order to further laminate the resin composition thereon, a multi-layered laminate was formed by applying a magnetic field having a current value of 84 A for 45 seconds, a magnetic field having a current value of 100 A for 10 seconds and a magnetic field having a current value of 125 A for 5 seconds after the secondary application, applying a magnetic field having a current value of 70 A for 40 seconds, a magnetic field having a current value of 90 A for 10 seconds and a magnetic field having a current value of 100 A for 5 seconds after the tertiary application, and applying a magnetic field having a current of 70 A for 30 seconds, a magnetic field having a current value of 85 A for 10 seconds and a magnetic field having a current value of 90 A for 5 seconds after the quaternary application.

Example 11

The primary application and curing were performed in the same manner as in Example 9. Thereafter, a laminate was formed by applying a magnetic field having a current value of 100 A for 45 seconds, a magnetic field having a current value of 120 A for 10 seconds and a magnetic field having a current value of 150 A for 5 seconds after the secondary application laminated thereon.

Example 12

The primary application and curing were performed in the same manner as in Example 10. Thereafter, for the secondary to quaternary applications and the magnetic field applications, a method of applying a magnetic field having a current value of 100 A for 45 seconds, a magnetic field having a current value of 120 A for 10 seconds and a magnetic field having a current value of 150 A for 5 seconds through the multi-profile method of the magnetic fields was performed, so that the same method was repeated four times to form a multi-layered laminate.

Comparative Example 1

Ferromagnetic (hard type) $FeOFe_2O_3$ particles (single-magnetic domains, average particle diameter about 100 nm) as magnetic particles, a bisphenol-based epoxy resin and the curing agent were each mixed at a weight ratio of 5:95:5 to prepare a resin composition.

Immediately after laminating it on a support through a nozzle in a feeding device, a magnetic field was applied thereto with a current value of 100 A for 10 minutes in an external alternate-current magnetic field generator. The magnetic field was applied by introducing the composition into a sample vial in a solenoid coil (3 turns, OD 50 mm, ID 35 mm) and adjusting the current value and time of the magnetic field generator (Easyheat from Ambrell). The resin composition was thermally cured with vibrational heat generated through application of the magnetic field to form a cured product.

Comparative Example 2

A resin composition was prepared and a cured product was formed, in the same manner as in Comparative Example 1, except that ferromagnetic (hard type) Fe particles (single-magnetic domain, average particle diameter about 50 nm) were used as the magnetic particles and the contents of the magnetic particles, the resin and the curing agent were each included in a weight ratio of 5:90:5.

Comparative Example 3

A resin composition was prepared and a cured product was formed, in the same manner as in Comparative Example 1, except that ferromagnetic (hard type) $StOFe_2O_3$ particles (single-magnetic domain, average particle diameter about 100 nm) were used as the magnetic particles and the contents of the magnetic particles, the resin and the curing agent were each included in a weight ratio of 5:90:5.

Experimental Example 1—Measurement of Coercive Force and Saturation Magnetization Value (Ms) of Magnetic Particles Coercive force and saturation magnetization Ms were measured by placing the magnetic particles dried at room temperature in a vibrating sample magnetometer (SQUID, measured by Korea Basic Science Institute) and using an HS curve (VSM curve) at ±1 Tesla as an external magnetic field.

Experimental Example 2—Measurement of Temperature of Composition after Curing

In Examples and Comparative Examples, immediately after the magnetic field application, a temperature inside the three-dimensional shape is confirmed by sticking a thermocouple therein.

Experimental Example 3—Measurement of Cure Degree (1) Visual Touch Sense

After curing the composition and cooling the cured product, the curing was confirmed by checking whether or not the cured product flowed when it was turned over, and then checking the degree of pressing of the cured product with a metal spatula. Here, it was classified as O when there was no flowability and the cured product was not pressed at all, as Δ when there was no flowability and the cured product was not pressed at all, but when the cured product was partially broken from the desired shape, and as X when there was flowability and the cured product was pressed.

(2) IR Data

The degree of curing is determined by using the ratio of the intensity (about 900 cm$^{-1}$) of the epoxy group and the intensity (about 1500 cm$^{-1}$) of the phenyl group before and after thermal curing of the composition and calculating it as a conversion ratio (%).

(3) DSC Data

The degree of curing is determined by measuring the amount of remaining heat (J/g) in the endothermic peak section, generated when the sample heat-cured after the magnetic field application is raised to a temperature of 300° C. at a temperature rise rate of 10° C./min by a cut DSC.

TABLE 1

| | | | | Measurement of Cure Degree | | |
|---|---|---|---|---|---|---|
| | Ms (emu/g) | Coercive Force (kOe) | Temperature after Curing (° C.) | Visual Touch Sense | IR | DSC |
| Example 1 | 72 | 70 | not measurable | O | 49% | 12.3 J/g |
| Example 2 | 74 | 80 | | O | 53% | 5.2 J/g |
| Example 3 | 74 | 80 | | O | 56% | 3.0 J/g |
| Example 4 | 82 | 92 | | O | 47% | 8.8 J/g |
| Example 5 | 80 | 94 | | O | 54% | 4.3 J/g |
| Example 6 | 74 | 80 | | O | 51% | 5.8 J/g |
| Example 7 | 74 | 80 | | O | 53% | 5.7 J/g |
| Example 8 | 74 | 80 | | O | 57% | 2.9 J/g |
| Example 9 | 74 | 80 | | O | — | — |
| Example 10 | 74 | 80 | | O | — | — |
| Example 11 | 74 | 80 | | Δ | — | — |
| Example 12 | 74 | 80 | | Δ | — | — |
| Comparative Example 1 | 218 | 2000 | 32 | X | not measurable | not measurable |
| Comparative Example 2 | 154 | 294 | 26 | X | not measurable | not measurable |
| Comparative Example 3 | 48 | 1500 | 41 | X | not measurable | not measurable |

In the case of Examples 1 to 12, the cured products hardened hardly, so that the temperature measurement using the thermocouple was impossible. In the case of Comparative Examples 1 to 3, it can be confirmed that they generate heat by an eddy current as a technique by electromagnetic induction, which generate heat by hysteresis loss of the magnetic body particles. Accordingly, Comparative Examples 1 to 3 did not satisfy the desired curing physical properties of the cured product.

What is claimed is:

1. A thermosetting composition comprising:
   magnetic particles having two or more magnetic domains, wherein the two or more magnetic domains are irregularly arranged when an external magnetic field is absent and are magnetized by an external alternating magnetic field; and
   a thermosetting resin,
   wherein the magnetic particles are vibrated by a magnetic reversal, and
   wherein the magnetic particles have a saturation magnetization value at 25° C. in a range of 60 to 150 emu/g.

2. The thermosetting composition according to claim 1, wherein the magnetic particles have a coercive force in a range of 1 to 200 kOe.

3. The thermosetting composition according to claim 1, wherein the magnetic particles have the saturation magnetization value at 25° C. in a range of 60 to 85 emu/g.

4. The thermosetting composition according to claim 1, wherein the magnetic particles have an average particle diameter in a range of 20 to 300 nm.

5. The thermosetting composition according to claim 1, wherein the two or more magnetic domains have an average size in a range of 10 to 50 nm.

6. The thermosetting composition according to claim 1, wherein the magnetic particles comprise a compound of Formula 1:

$$MX_aO_b \qquad \text{[Formula 1]}$$

wherein M is a metal oxide, X comprises Fe, Mn, Co, Ni or Zn, and $|a \times c| = |b \times d|$ is satisfied, where c is a cation charge of X, and d is an anion charge of oxygen.

7. The thermosetting composition according to claim 6, wherein M is an oxide of Fe or Mn.

8. The thermosetting composition according to claim 6, wherein the magnetic particles comprise a mixture of compounds of Formula 1 or a compound comprising the compound of Formula 1 doped with an inorganic substance.

9. The thermosetting composition according to claim 1, wherein the thermosetting composition comprises the magnetic particles in an amount of 0.01 to 25 parts by weight relative to 100 parts by weight of the thermosetting resin.

10. The thermosetting composition according to claim 1, wherein the magnetic particles form magnetic clusters.

11. The thermosetting composition according to claim 1, wherein the thermosetting resin comprises at least one thermosetting functional group.

12. The thermosetting composition according to claim 11, wherein the at least one thermosetting functional group comprises an epoxy group, a glycidyl group, an isocyanate group, a hydroxy group, a carboxyl group and/or an amide group.

13. The thermosetting composition according to claim 1, further comprising a thermosetting agent.

14. The thermosetting composition according to claim 1, further comprising a filler.

15. The thermosetting composition according to claim 1, further comprising a dispersant.

16. A method for curing the thermosetting composition of claim 1, the method comprising a step of applying a magnetic field to the thermosetting composition of claim 1.

17. The method for curing the thermosetting composition according to claim 16, wherein the step of applying the magnetic field comprises applying the magnetic field with a current of 50 A to 500 A for 20 seconds to 60 minutes at a frequency of 100 kHz to 1 GHz.

18. The method for curing the thermosetting composition according to claim 16, wherein the step of applying the magnetic field comprises performing a multi-profile method that comprises sequentially applying at least two magnetic fields.

19. The method for curing the thermosetting composition according to claim 18, wherein the multi-profile method comprises:
- a first step of applying a first magnetic field with a current of 10 A to 120 A for 20 seconds to 10 minutes;
- a second step of applying a second magnetic field with a current of 80 A to 150 A for 20 seconds to 10 minutes; and
- a third step of applying a third magnetic field with a current of 85 A to 500 A for 5 seconds to 5 minutes, wherein the first, second, and third magnetic fields are applied at a frequency of 100 kHz to 1 GHz.

20. The method for curing the thermosetting composition according to claim 16, wherein the thermosetting composition comprises a first portion and a second portion, and the step of applying the magnetic field comprises applying a first magnetic field to the first portion of the thermosetting composition, and
wherein the method further comprises adding the second portion of the thermosetting composition onto the first portion of the thermosetting composition after applying the first magnetic field.

21. The method for curing the thermosetting composition according to claim 20, further comprising applying a second magnetic field after adding the second portion of the thermosetting composition, wherein the first magnetic field is applied with a first current value a1, the second magnetic field is applied with a second current value a2, and a ratio a1/a2 is in a range of 1.01 to 3.0.

22. The method for curing the thermosetting composition according to claim 16, wherein the step of applying the magnetic field comprises decreasing a current value or a magnetic field application time as a volume of the thermosetting composition increases.

23. A cured product comprising a cured form of the thermosetting composition of claim 1.

24. The thermosetting composition of claim 1, wherein the vibration of the magnetic particles generates heat sufficient to cure the thermosetting resin.

* * * * *